(12) United States Patent
Koskela et al.

(10) Patent No.: US 11,297,596 B2
(45) Date of Patent: Apr. 5, 2022

(54) PAGING OCCASION START DETERMINATION

(71) Applicant: Nokia Technologies Oy, Espoo (FI)

(72) Inventors: Jarkko Koskela, Oulu (FI); Jorma Kaikkonen, Oulu (FI); Sami Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/409,621

(22) Filed: May 10, 2019

(65) Prior Publication Data

US 2019/0349885 A1 Nov. 14, 2019

Related U.S. Application Data

(60) Provisional application No. 62/670,354, filed on May 11, 2018.

(51) Int. Cl.
*H04W 68/02* (2009.01)
*H04W 24/08* (2009.01)
*H04W 72/04* (2009.01)
*H04W 72/08* (2009.01)
*H04W 68/00* (2009.01)

(52) U.S. Cl.
CPC ........... *H04W 68/02* (2013.01); *H04W 24/08* (2013.01); *H04W 72/0446* (2013.01); *H04W 72/085* (2013.01)

(58) Field of Classification Search
CPC . H04W 68/02; H04W 24/08; H04W 72/0446; H04W 72/085; H04W 68/005
USPC ...................................... 455/426.1, 458, 515
See application file for complete search history.

(56) References Cited

U.S. PATENT DOCUMENTS

2011/0223942 A1 9/2011 Xu et al.
2018/0234229 A1* 8/2018 Somichetty ........... H04L 5/0044
(Continued)

FOREIGN PATENT DOCUMENTS

| EP | 3240339 A1 | 11/2017 |
| WO | WO-2017158440 A1 | 9/2017 |
| WO | WO-2018023364 A1 | 2/2018 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304, 3rd Generation Partnership Project (3GPP), No. V14.4.0, Sep. 2017, pp. 1-49.

*Primary Examiner* — Michael Y Mapa
(74) *Attorney, Agent, or Firm* — Mintz Levin Cohn Ferris Glovsky and Popeo, P.C.

(57) ABSTRACT

Methods and apparatus, including computer program products, are provided for monitoring occasions in a downlink, such as paging occasions. In some example embodiments, there may be provided an apparatus that includes at least one processor and at least one memory including computer program code, the at least one memory and the computer program code configured to, with the at least one processor, cause the apparatus to at least receive information indicating a start of one or more paging occasions within at least a portion of a frame and monitor the one or more paging occasions in accordance with the received information. Related systems, methods, and articles of manufacture are also described.

17 Claims, 8 Drawing Sheets

(56) References Cited

U.S. PATENT DOCUMENTS

2019/0149257 A1\* 5/2019 Jiang ................ H04L 5/0094
 370/342
2019/0215815 A1\* 7/2019 Blankenship ..... H04W 72/0406
2020/0280957 A1\* 9/2020 Gao .................. H04W 76/28

\* cited by examiner

PAGING OCCASION START DETERMINATION

CROSS-REFERENCE

This application claims the benefit of U.S. Provisional Patent Application No. 62/670,354, entitled "Paging Occasion Start Determination," filed May 11, 2018, the contents of which are incorporated herein in their entirety.

FIELD

The subject matter described herein relates to paging in wireless systems.

BACKGROUND

The cellular system including the Fifth Generation (5G) system may support an increasing number of devices and services including applications with a wide range of use cases and diverse needs with respect to bandwidth, latency, and reliability requirements. For example, multiple input, multiple output technology may be used to increase throughput/data rate. The system may also be configured to support machine-to-machine communications as well as ultra-reliable, low latency services.

SUMMARY

Methods and apparatus, including computer program products, are provided for monitoring occasions in a downlink, such as paging occasions.

In some example embodiments, there may be provided an apparatus that includes at least one processor and at least one memory including computer program code, the at least one memory and the computer program code configured to, with the at least one processor, cause the apparatus to at least receive information indicating a start of one or more paging occasions within at least a portion of a frame and monitor the one or more paging occasions in accordance with the received information.

In some variations, one or more of the features disclosed herein including the following features can optionally be included in any feasible combination. The information may include a bitmap indicating the start of the one or more paging occasions in at least a portion of a subframe. The bitmap may indicate the start of the one or more paging occasions. A bit length of the bitmap may depend on a subcarrier spacing being used. The bitmap may indicate a starting slot of the one or more paging occasions. The bitmap may indicate each slot in a paging frame. The bitmap may indicates each slot in a subframe, a frame, in an uplink-downlink pattern, and/or in an uplink-downlink concatenated pattern. The one or more paging occasions may include one or more physical downlink control channel monitoring occasions. A physical downlink control channel configuration may include the information indicating the start of one or more paging occasions. The apparatus may comprise or may be comprised in a user equipment.

In some additional embodiments, there may be provided an apparatus that includes at least one processor and at least one memory including computer program code, the at least one memory and the computer program code configured to, with the at least one processor, cause the apparatus to at least send, to a user equipment, information indicating a start of one or more paging occasions within at least a portion of a frame and trigger one or more paging occasions in accordance with the sent information.

In some variations, one or more of the features disclosed herein including the following features can optionally be included in any feasible combination. The information may include a bitmap indicating the start of the one or more paging occasions in at least a portion of a subframe. The bitmap may indicate the start of the one or more paging occasions. A bit length of the bitmap may depend on a subcarrier spacing being used. The bitmap may indicate a starting slot of the one or more paging occasions. The bitmap may indicate each slot in a paging frame. The bitmap may indicate each slot in a subframe, a frame, in an uplink-downlink pattern, and/or in an uplink-downlink concatenated pattern. The one or more paging occasions may include one or more physical downlink control channel monitoring occasions. The triggered one or more paging occasions may further causes the apparatus to at least provide the one or more paging occasions to the user equipment via the information indicating the start of one or more paging occasions. The apparatus may comprise or may be comprised in a network node.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

In the cellular system including the Fifth Generation (5G) cellular system, paging will be more complex, when compared to prior cellular systems, due to many of 5G's features, such as multiple input, multiple output technology (MIMO), for example. As such, the user equipment (UE) task of determining when there is a paging occasion to monitor a page is more complex.

For paging, the cellular network may provide to the UE information including parameters. These parameters may be received, via signaling, broadcast, and/or the like, and these parameter may include the paging occasion configuration, such as time offset in a frame, duration, periodicity, and/or the like. Moreover, the physical downlink control channel (PDCCH) configuration may provide the UE with the search space configuration including the monitoring occasions within a paging occasion. For paging, the core resource set (CORESET) configuration may reuse the same configuration for the remaining minimum system information (RMSI) CORESET as indicated in the physical broadcast channel (PBCH). In addition, the UE may assume quasi-colocation (QCL) between synchronization signal (SS) blocks, paging downlink control information/indicators (DCIs), and paging messages. Moreover, the UE may not be required to soft combine multiple paging DCIs within one paging occasion. Furthermore, the air interface support by the UE and base station may also support the sending of so-called "short paging messages," such as a systemInfoModification, cmas-Indication, and/or etws-Indication, as part of the paging DCI.

MIMO technology, as noted, may be supported, so multi-beam operations may increase the complexity of paging. To that end, the length in time (e.g., duration) of a paging occasion may be set to one period of a beam sweeping, and the same paging message may be repeated in all beams of the sweeping pattern. As such, a single paging occasion may cover the entire beam sweep, so a UE's monitoring pattern may take this into account as well.

The UE may receive from the network a system information block (SIB), such as a SIB type 1. When this is the case, the SIB 1 may provide the UE with information to enable uplink (UL) and downlink (DL) slot configuration. For example, the UL/DL slot configuration may be determined via one or two concatenated slot patterns, which repeat in time to form a subframe of a frame carried by the PDCCH. The configuration for each pattern indicates the slots of a subframe defined as downlink slots ("D") containing only DL symbols, bi-directional (e.g., flexible, 'X') slots allowing both downlink and uplink symbols, or uplink only slots ('U') containing only UL symbols. The slot may include one or more symbols.

The pattern may have a time period configured that is based in part on the sub-carrier spacing to enable a determination of the slots within a subframe of a frame. The configuration for each pattern may provide the quantity (e.g., number) of DL only slots (from the start of the time period), the quantity of DL symbols from the start of the flexible slot, the quantity of UL only slots (from the end of the time period), and the quantity of UL symbols from the end of the flexible slot. Slots that are not indicated to be DL only slots, nor UL only slots are flexible slots.

To illustrate further, a UE may be scheduled to receive, in the downlink, only in DL symbols ("D") portion or the flexible symbols ("X") portion. Similarly, the UE may be scheduled to transmit only in the UL symbols ("U") portion or flexible symbols ("X") portion. For the flexible slots (which would be the remaining slots among the DL only ("D") slots and UL only ("U") slots), the symbol partition in the flexible slots may be determined. This may be determined by determining the number of DL only symbols (from the start of the slot) and UL only symbols (from the end of the slot), while the remaining symbols in between may be considered flexible symbols.

3GPP 38.213 explains that for random access channel (RACH) occasion mapping, if a UE is provided a first higher layer parameter (e.g., tdd-UL-DL-ConfigurationCommon) or is also provided second, higher layer parameter (e.g., tdd-UL-DL-ConfigurationCommon2), the valid physical RACH (PRACH) occasions are those occasions that include uplink symbols or flexible symbols that start at least $N_{gap}$ symbols after a last downlink symbol or a last SS/PBCH block transmission symbol where $N_{gap}$ is provided in table, such as Table 1 below, as a function of the preamble subcarrier spacing value. For preamble format B4 for example, the $N_{gap}=0$.

TABLE 1

| Preamble subcarrier spacing | $N_{gap}$ |
|---|---|
| 1.25 kHz or 5 kHz | 0 |
| 15 kHz or 30 kHz or 60 kHz | 2 |
| 120 kHz | 2 or 3 |

The time domain resource allocation (RA) for the physical downlink shared channel (PDSCH) may be performed via the 4 bit resource allocation field of the DCI. The default interpretation of the resource allocation field may be determined in accordance with a standard, such as 3GPP TS 38.214, although the time domain resource allocation may be provide to, and configured at, the UE via broadcast or dedicated signaling from the network, such as a base station including the new radio (NR) node B (gNB). The supported PDSCH allocation sizes may be configured for the Type A primary synchronization channel (PSCH) mapping (3, . . . , 14) and for the PDSCH Type B (sub-slot based scheduling) mapping (2, 4, or 7). This PDSCH mapping type may be provided by the PDSCH time domain resource allocation, which may be in accordance with a standard, such as 3GPP TS 38.214.

In Long Term Evolution (LTE), the paging frame (PF) calculation indicates where in the radio frame the UE needs to listen for paging. The paging occasion calculation may have subframe accuracy to enable the UE to listen to a paging DCI (which is the indicator/information allocating resources for the paging message).

In the 5G new radio (NR) system, the paging occasion calculation may not be as straightforward as in previous generations of wireless systems, in which fixed time division duplex (TDD) patterns and fixed numerology with respect to frame structure are implemented. In the 5G NR's numerology, there can be variations in the subcarrier spacing of 15 kHz, 30 kHz, 60 kHz, and 120 kHz for data, and these variations also affect slot allocations as well. Moreover, the 5G NR's flexible TDD patterns (in which any slot of a subframe can be configured as a downlink slot, an uplink slot, or a flexible slot) may lead to variation that makes paging occasion determination more complex, when compared to previous cellular systems. Indeed, the determination of the paging occasion can, if not properly performed, lead to discrepancies and wasted power and resources.

In some example embodiments, the network, such as a base station, NR gNB base station, and/or the like, may provide to the UE information that explicitly defines or indicates which slots of a subframe of a radio frame are utilized for paging occasion calculation. For example, after the UE gets knowledge of possible paging occasions, then a calculation (by the network) is done to distribute different UEs to different POs of same Paging frame (PF). This is done to ensure that not all UEs will listen to the same paging occasion (e.g., otherwise the paging message size would become too big to be transmitted as so many UE identities need to be present in the paging message).

In some example embodiments, the network, such as a base station, gNB, and/or the like, may provide to the UE, a bitmap indicating which slots are utilized for PO calculation. Suppose for example, 120 kHz subcarrier spacing and an aggregate periodicity of 20 milliseconds (ms) for a semi-static UL/DL configuration, the bitmap may be 160 bits long to cover an entire UL/DL TDD slot pattern including the repetitions of that pattern (e.g., 160 slots with 120 kHz subcarrier spacing within the 20 ms period).

Alternatively or additionally, the bitmap may be dependent on the used subcarrier spacing (e.g., for 15 kHz subcarrier spacing, the bitmap is only 20 bits), in accordance with some example embodiments. For example, different sub-carrier spacing (SCS) may require different sizes of bitmaps to cover whole period, so that a 120 kHz SCS bit map may be 160 bits in length, while a 15 kHz sub-carrier spacing (with a slot length of 1 ms) is only 20 bits in length to cover an entire period. As such, different bitmaps would be provided to a UE based on the SCS being used by the UE.

Alternatively or additionally, the network may use a configured TDD configuration (TDD-UL-DL-ConfigCommon—1&2 concatenated) to get a complete TDD configuration in order to only require bitmap covering the repetitive TDD UL/DL configuration, in accordance with some example embodiments. For example, the TDD configuration repetition may be a maximum of 20 ms (10 ms+10 ms) with 0.5 ms slot in order to cover a whole sweep period, in which case the bitmap would correspond to a 40 bit bitmap. This bitmap length may be optimized based on the subcarrier spacing and the length of the TDD configuration (e.g., if 1 ms slot and 10 ms TDD configuration then a 10 bit bitmap may be used). To illustrate further, the network will provide the UE with a bitmap based on the SCS and the known TDD pattern length (e.g., at 15 kHz, 1 ms slot, and 10 ms period of TDD pattern, then a 10 bit bitmap is provided to the UE, while in the case of 120 kHz, 0.125 ms, and 10 ms period of TDD pattern, then an 80 bit bitmap is provided to the UE).

Alternatively or additionally, the network may use the configured TDD configuration (TDD-UL-DL-ConfigCommon—1&2 concatenated to get full TDD configuration) so that the duration of the paging frame (e.g., 10 ms) is divided into blocks corresponding to UL-DL configuration length (or period). However, the bitmap is used to indicate the starting position of the paging occasion within the paging frame (so that it is aligned with the start of the UL/DL pattern). For example, the quantity (or number) of possible paging occasion starting positions (in paging frame) may be determined by:

$$N_{num}^{PO} = \left\lfloor \frac{T_{ms}^{PF}}{L_{ms}^{UL-DL\ period}} \right\rfloor,\quad \text{Equation 1}$$

wherein the $T_{ms}^{PF}$ is the length of the paging frame (e.g., 10 ms) and $L_{ms}^{UL-DL\ period}$ is the length of a single UL-DL slot pattern (e.g. 0.5 ms) or alternatively, length of the concatenated pattern, which may be repeated across the whole period of the beam sweep. $N_{num}^{PO}$ may determine the quantity of required bits (assuming, for example, a paging frame of 10 ms and a minimum UL-DL slot configuration length of 0.5 ms, the resulting bitmap is 20 bits).

Alternatively or additionally, the network may determine a bitmap, which may include multiple paging occasion starting positions within a UL/DL configuration period, wherein each '1' within a bitmap may correspond to the starting position of paging occasion in a paging frame.

Alternatively or additionally, the network may signal to the UE the Nth possible slot(s) being used for paging occasions in the paging frame. To illustrate, the network, such as a base station, may signal to a UE the 1st and 3rd possible slots being used for paging. When this is the case, the UE knows the TDD UL/DL pattern and sees that in the corresponding paging frame to treat the 3rd slot (which can be a DL a lot or bi-directional slot, X) as paging slot, and then the subsequent $10^{th}$ slot and so forth as a paging occasion. This example assumes that the TDD pattern is dividable by 10 ms, and that in different paging frames different slots are DL/UL.

Alternatively or additionally, the duration of the paging occasion may be determined to be one or multiple of UL-DL slot pattern periods or concatenated UL-DL slot pattern periods, wherein the factor determining the number of periods may be determined via a specification or provided by higher layer signaling, and/or depend on other parameters, such as used sub-carrier spacing, length of paging frame, and/or period of UL-DL slot pattern and/or the like.

Alternatively or additionally, the duration of the paging frame may be determined to be multiple one for multiple of UL-DL slot pattern periods or concatenated UL-DL slot pattern periods, wherein the factor determining the number of periods may be determined via a specification or provided by higher layer signaling, and/or depend on other parameters, such as used sub-carrier spacing, number of paging occasions in paging frame, and/or and the like.

One or more of the bitmap implementations noted above may be combined to provide a bitmap, in accordance with some example embodiments.

Figure 1:
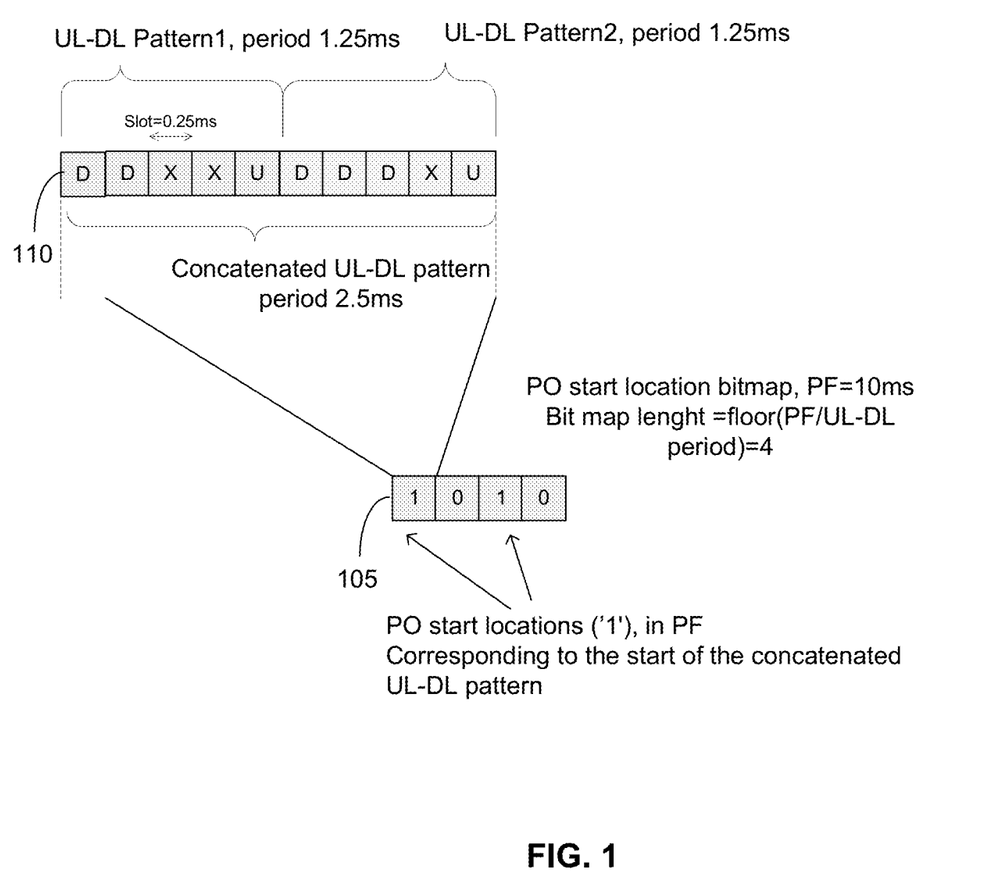
FIG. 1-FIG. 3 depict examples of bitmaps, in accordance with some example embodiments.

FIG. 1 depicts an example of a paging occasion bitmap 105, in accordance with some example embodiments. The bitmap 105 depicts paging occasion start locations labeled "1." In this example, the start locations for paging occasions would be the beginning of the concatenated UL-DL pattern 110. In this example, the start of the paging frame (PF) is 10 milliseconds (ms) long, and the concatenated UL-DL pattern 110 is 2.5 ms long, so the paging occasions would occur twice in the paging frame, at the start of the concatenated UL-DL pattern 110 and at the start of the third concatenated UL-DL pattern 110. In this way, the bitmap enable the user equipment to calculate the paging occasions.

Figure 2:
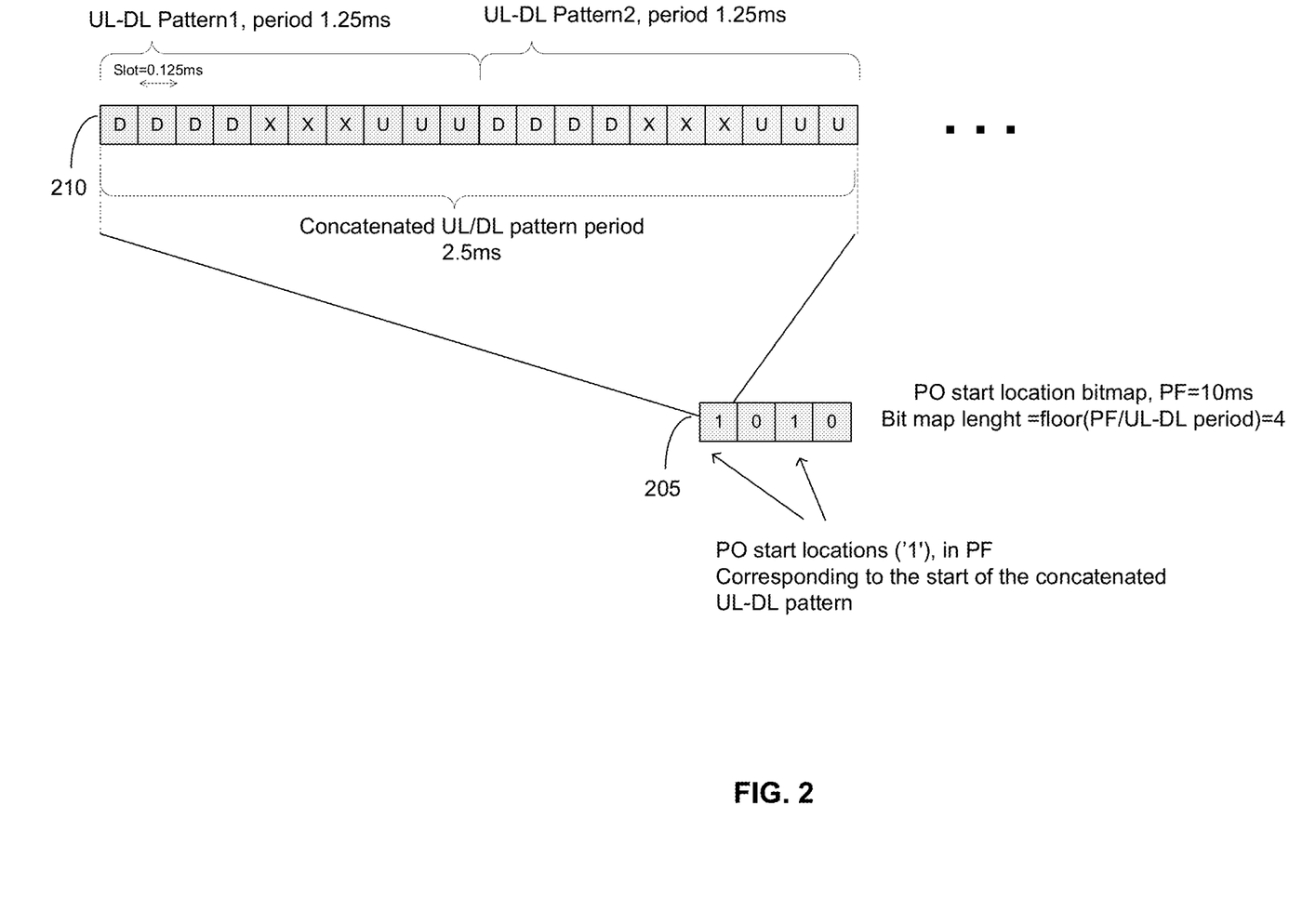

FIG. 2 depicts another example of a paging occasion bitmap 205, in accordance with some example embodiments. The bitmap 205 depicts paging occasion start locations labeled "1." In this example, the start locations for paging occasions would be the beginning of the concatenated UL-DL pattern 210. In this example, the paging frame (PF) is 10 milliseconds (ms) long. The concatenated UL-DL pattern 210 is 2.5 ms long. Unlike FIG. 1, the slot is 0.125 ms, so UL-DL pattern 1 has a period of 1.25 ms and UL-DL pattern 2 has a period of 1.25 ms. However, like FIG. 1, the bitmap 205 at FIG. 2 would define the paging occasions at the start of the concatenated UL-DL pattern 210 in the page frame and at the start of the third concatenated UL-DL pattern 210 within the paging frame.

Figure 3:
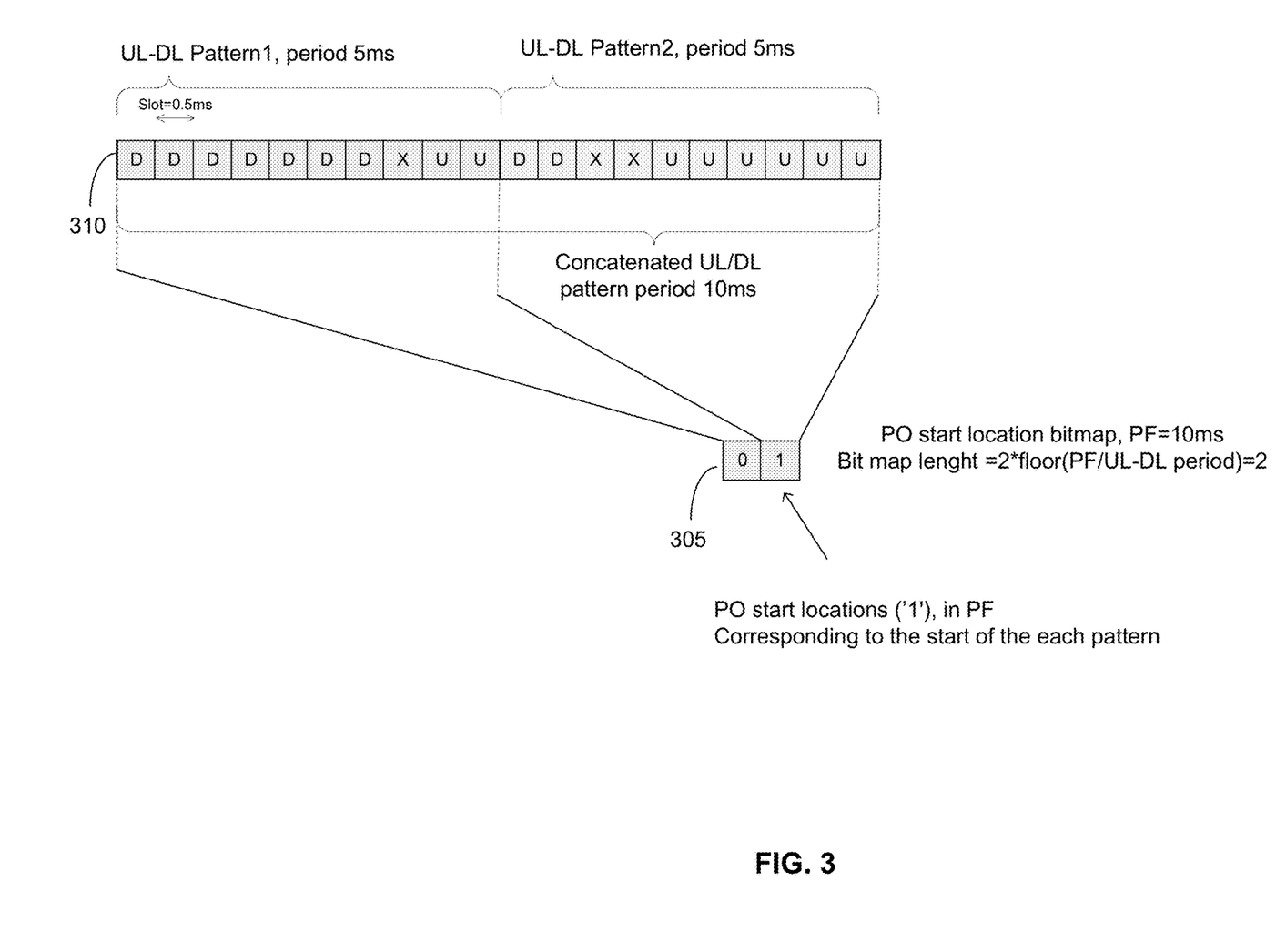

FIG. 3 depicts another example of a paging occasion bitmap 305, in accordance with some example embodiments. The bitmap 305 depicts paging occasion start location(s) labeled "1." In this example, the "1" indicates the start location for each pattern in the concatenated pattern. For example, the value "1" in the bitmap indicates that the start of UL-DL pattern 2 is a paging occasion. In this example, the paging frame (PF) is 10 milliseconds (ms) long; the concatenated UL-DL pattern 210 is 10 ms long, and the slot is 0.5 ms.

Figure 4:
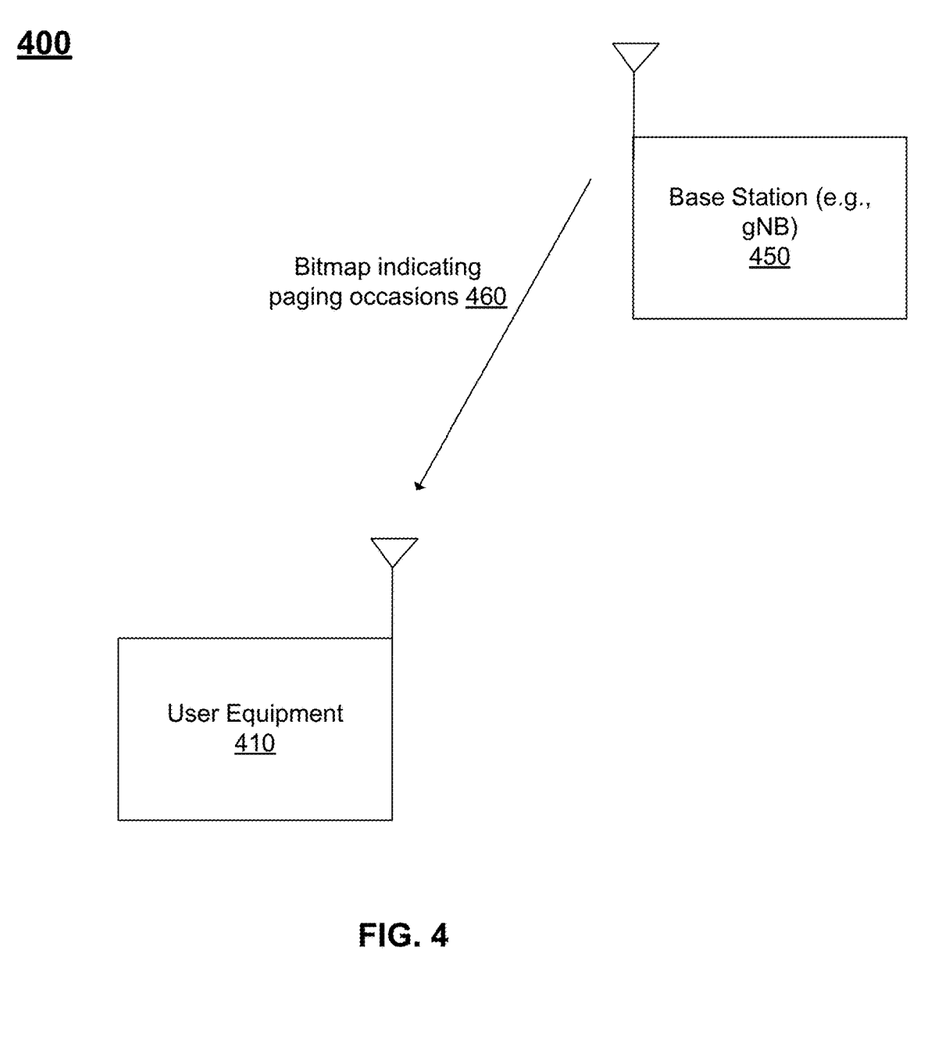
FIG. 4 depicts an example of a system including a user equipment receiving information explicitly indicating paging occasions within subframes, in accordance with some example embodiments.

FIG. 4 depicts an example of a portion of a wireless system 400 including at least one user equipment 410 and at least one base station 450, in accordance with some example embodiments.

The UE 410 may be configured to wirelessly couple to a radio access network being served by a wireless access point, such as a base station 450, which may be referred to as 5G gNB base station. The base station 450 may provide to the UE 410 information 460 explicitly indicating the start of paging occasions in a frame. For example, the information 460 may include a bitmap explicitly indicating to the UE 410 the start of paging occasion at subframes within a frame. FIGS. 1-3 above describe examples of bitmaps 105-305 that signal to the UE 410 the start of paging occasions. When the UE 410 receives the information 460, the UE 410 may know when it can choose to monitor a paging occasion from the base station 450.

The base station 450 may be coupled to core network, which may include an access and mobility management function (AMF), a visiting session management function (V-SMF), a visiting policy control function (v-PCF), a visiting network slice selection function (v-NSSF), a visiting user plane function (V-UPF), and/or other nodes as well.

Figure 5:
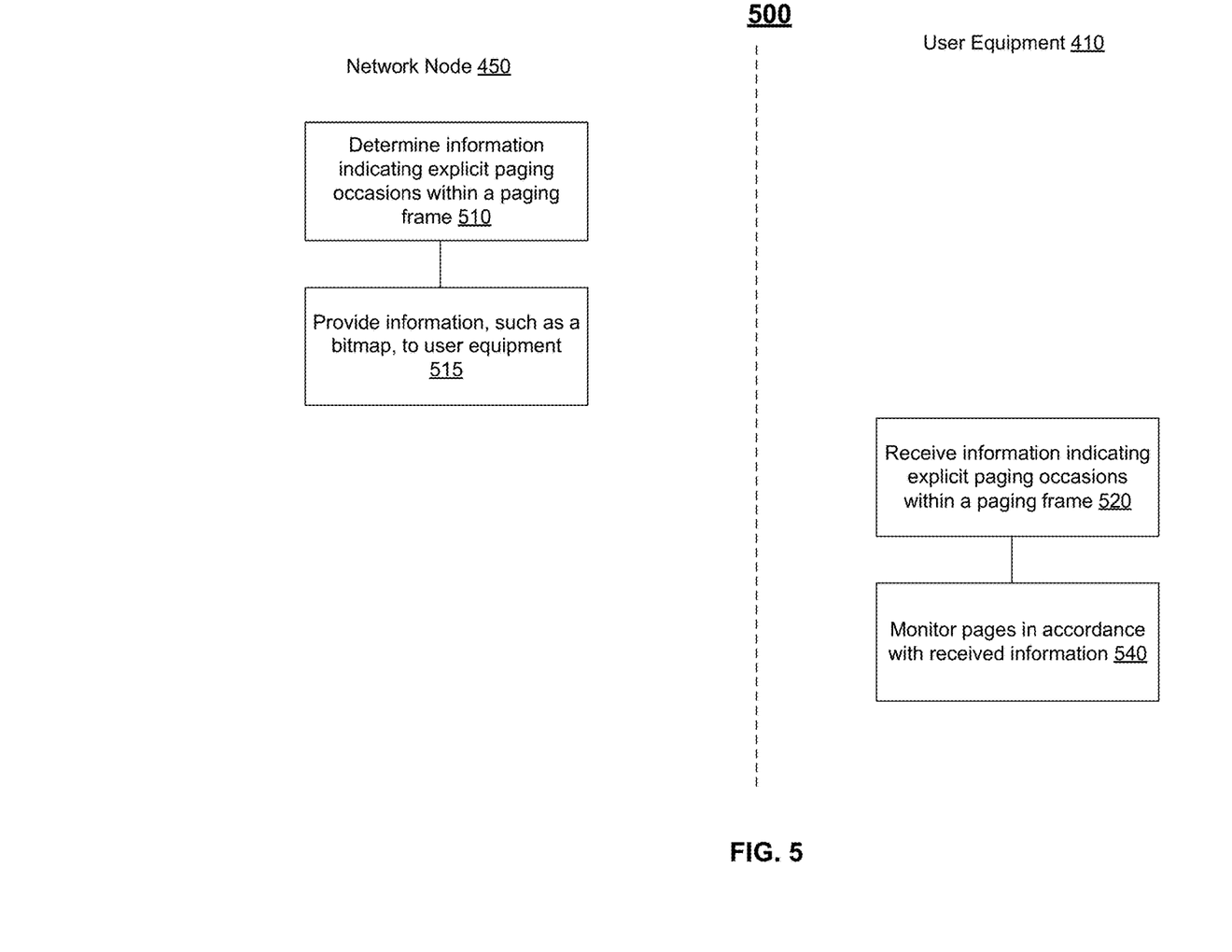
FIG. 5 depicts an example process for determining and providing information explicitly indicating paging occasions within subframes, in accordance with some example embodiments.

FIG. 5 depicts an example of a process 500 of providing a user equipment with explicit information regarding the start of paging occasions within a new radio frame, in accordance with some example embodiments.

At 510, a network node, such as base station 450, may determine information indicating explicit paging occasions within a frame, in accordance with some example embodiments. For example, the network node may determine the information as a bitmap, such as bitmap 105-305. The bitmap indicates where in a frame a UE 410 should start to listen/monitor for a paging occasions.

At 515, the network node, such as base station 450, may providing the information, such as a bitmap, indicating explicit paging occasions within a frame, in accordance with some example embodiments. For example, the network node may be provide via a system information block, such as SIB2, the bitmap, such as bitmaps 105-305, to the UE 410.

At 520, the user equipment 410 may receive the information, such as a bitmap, indicating explicit paging occasions within a frame, in accordance with some example embodiments. For example, the user equipment may receive the information, such as the bitmap, via a system information block, such as SIB2.

At 540, the UE 410 may monitor paging occasions in accordance with the information received at 520, in accordance with some example embodiments. Referring again to FIG. 2, the UE may monitor, based on the bitmap 205 received at 520, paging occasions at the start of the concatenated UL-DL pattern 210 in the paging frame and at the start of the third occurrence of the concatenated UL-DL pattern 210 within the paging frame.

In some example embodiments, a user equipment may be configured to at least receive information indicating a start of one or more paging occasions within at least a portion of a frame and monitor the one or more paging occasions in accordance with the received information. The information may include a bitmap indicating the start of the one or more paging occasions in at least a portion of a subframe. The bitmap may indicate the start of the one or more paging occasions. A bit length of the bitmap may depend on a subcarrier spacing being used. The bitmap may indicate a starting slot of the one or more paging occasions. The bitmap may indicate each slot in a paging frame. The bitmap may indicates each slot in a subframe, a frame, in an uplink-downlink pattern, and/or in an uplink-downlink concatenated pattern. A physical downlink control channel configuration may include the information indicating the start of one or more paging occasions.

In some additional embodiments, a network node (e.g., a base station, 5G gNB, etc.) may be configured to at least send, to a user equipment, information indicating a start of one or more paging occasions within at least a portion of a frame and trigger one or more paging occasions in accordance with the sent information. The information may include a bitmap indicating the start of the one or more paging occasions in at least a portion of a subframe. The bitmap may indicate the start of the one or more paging occasions. A bit length of the bitmap may depend on a subcarrier spacing being used. The bitmap may indicate a starting slot of the one or more paging occasions. The bitmap may indicate each slot in a paging frame. The bitmap may indicate each slot in a subframe, a frame, in an uplink-downlink pattern, and/or in an uplink-downlink concatenated pattern. A physical downlink control channel configuration may include the information indicating the start of one or more paging occasions. The triggered one or more paging occasions may further causes the apparatus to at least provide the one or more paging occasions to the user equipment via the information indicating the start of one or more paging occasions. The apparatus may comprise or may be comprised in a network node.

Figure 6:
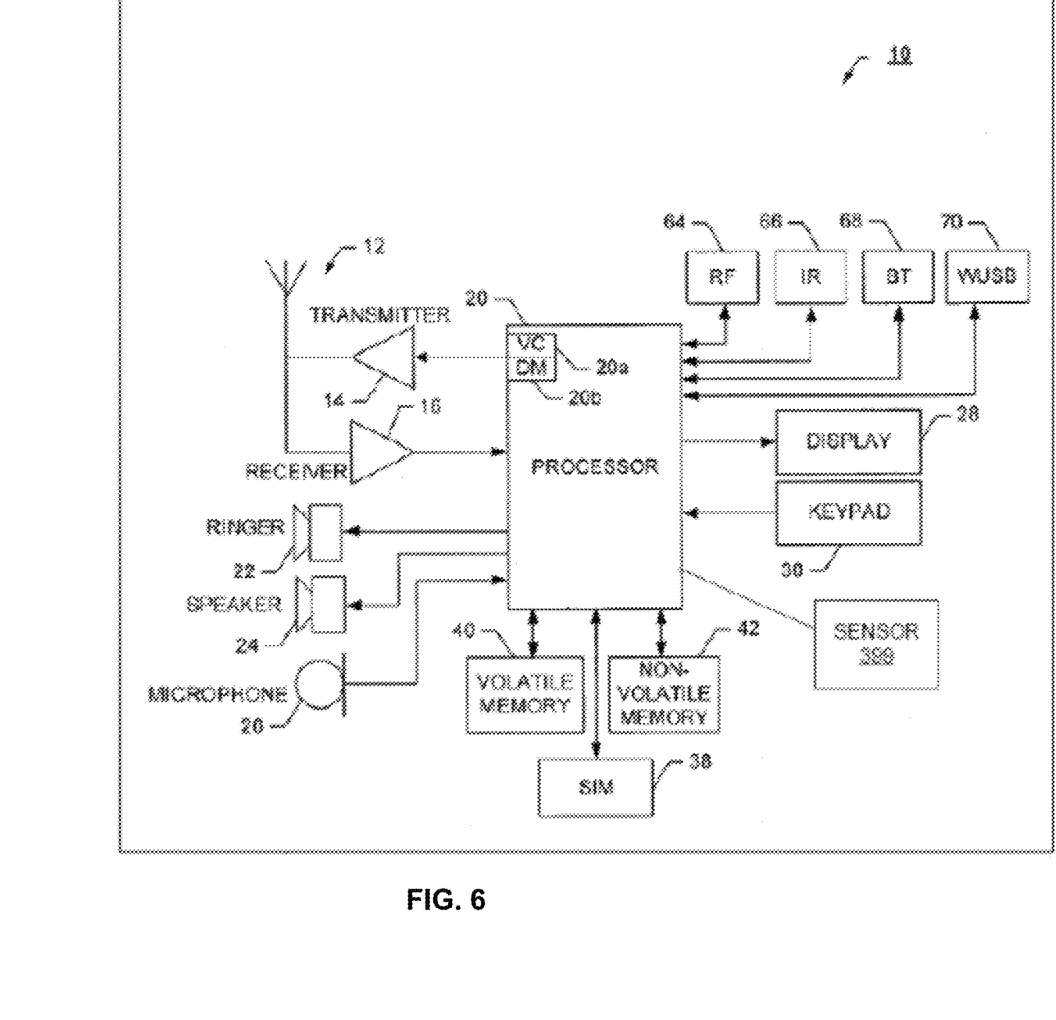
FIG. 6 depicts an example of an apparatus, in accordance with some example embodiments.

FIG. 6 illustrates a block diagram of an apparatus 10, in accordance with some example embodiments.

The apparatus 10 may represent a user equipment, such as the user equipment 410. The apparatus 10, or portions therein, may be implemented in other network nodes including base stations (e.g., devices 450).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including one or more aspects of process 500. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations (e.g., process 500 and/or other operations) disclosed herein with respect to the base stations and the UEs.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Figure 7:
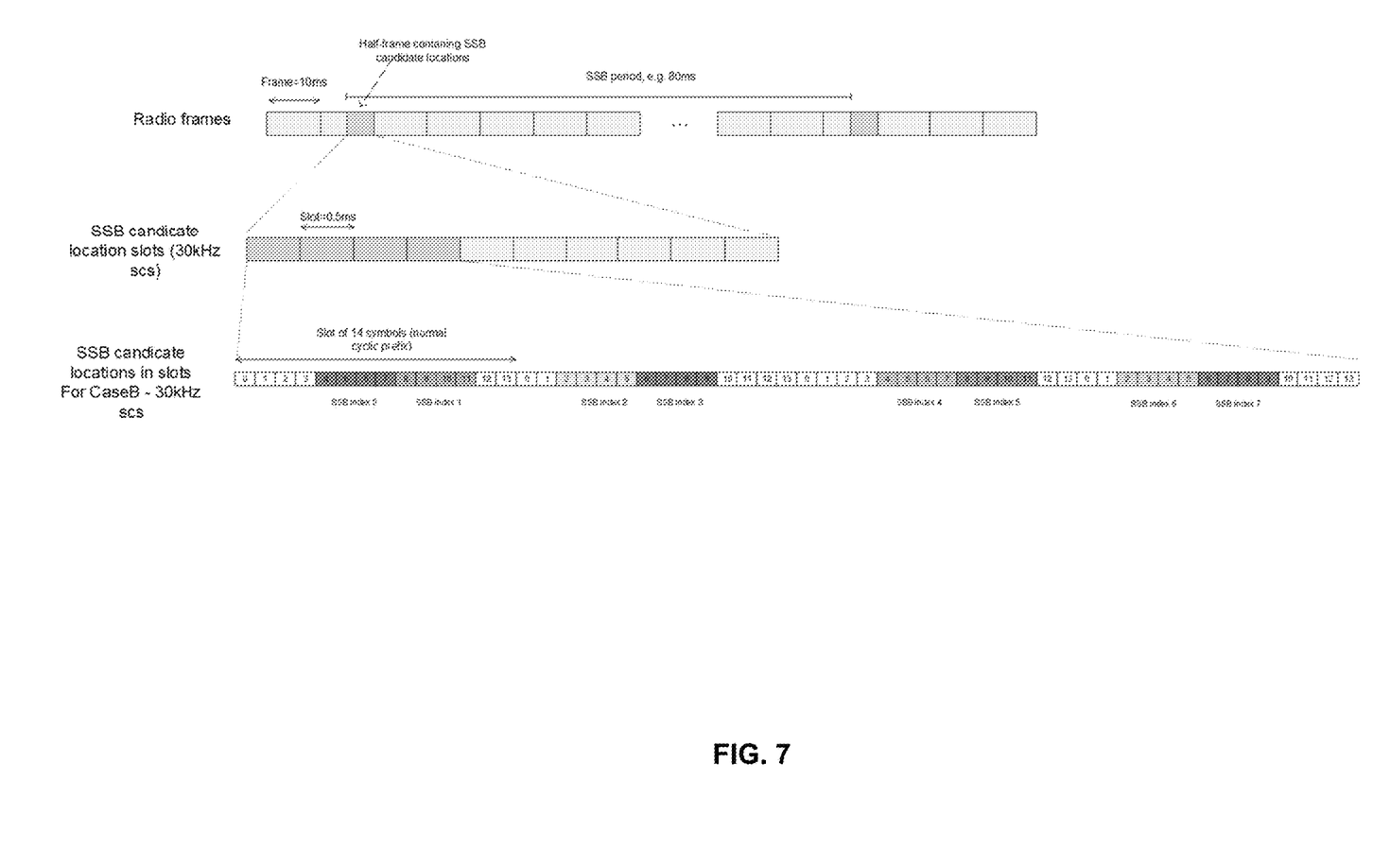
FIG. 7 depicts block candidate location patterns, in accordance with some example embodiments.

The following provides some additional description related to beam sweeping in the 5G New Radio. The UE may obtain time and frequency synchronization to a cell (and obtains the Cell-ID) through detecting SS/PBCH blocks (SSB). The SSB may contain the Primary Synchronisation Signal (PSS), Secondary Synchronization Signal (SSS) and Primary Broadcast Channel (PBCH) together with Demodulation Reference Signals (DMRS) associated to PBCH (see, e.g., TS 38.213, section 4.1). The PSS and SSS may carry the Cell-ID via sequence initialization, and PBCH may carry Master Information Block (MIB) including DMRS, SSB index, and/or the like. To support beam forming, the SSB can be sent to different spatial direction in a time multiplexed manner. Candidate locations in a half-frame (5 ms) are illustrated in FIG. 7 for a certain use case at 30 kHz (see, e.g., Case B at TS 38.213].

Figure 8:
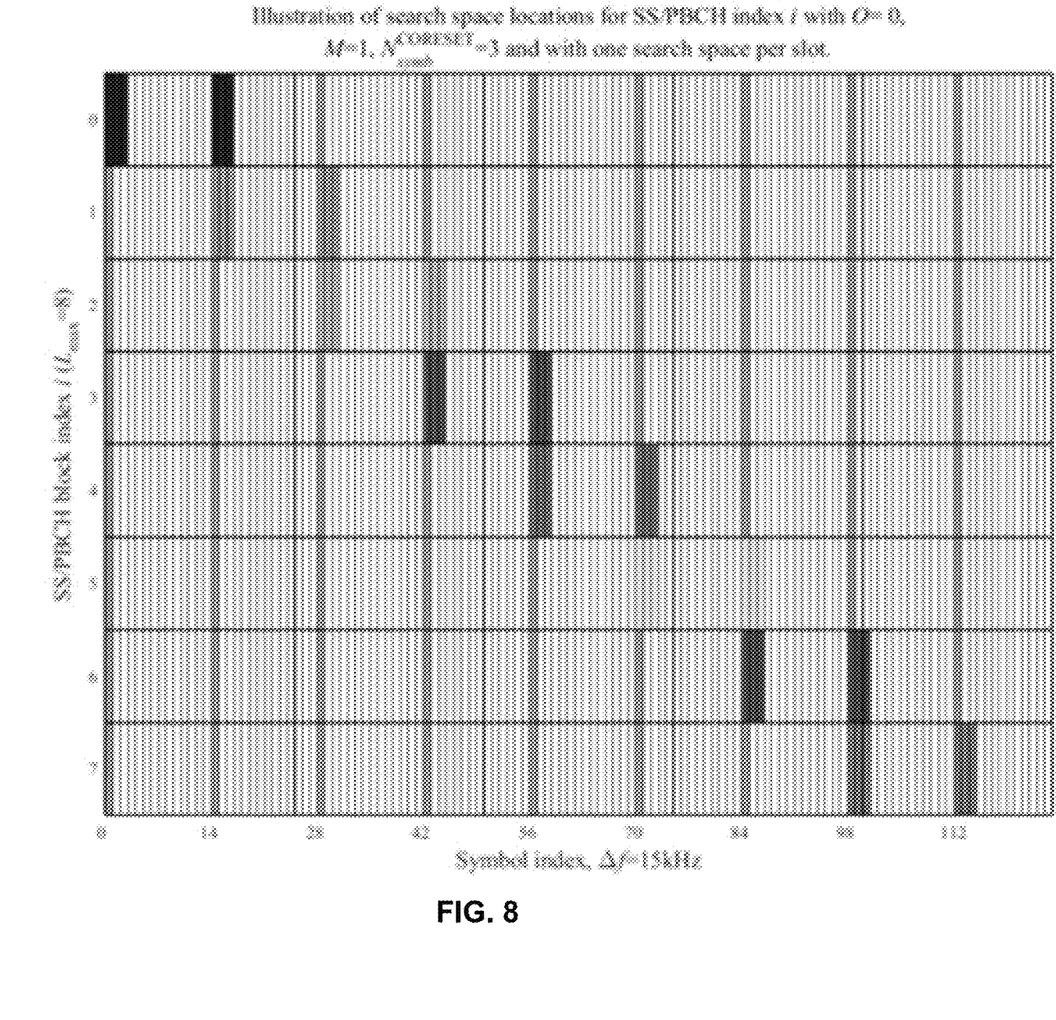
FIG. 8 depicts an example search space on the physical downlink control channel, in accordance with some example embodiments.

The pattern of SSBs sent in the half-frame pattern is repeated with a certain period (e.g., 5, 10, 20, 40, 80, or 160 ms). Correspondingly, for System Information Block 1 (SIB1), the UE is configured via MIB ('pdcch-ConfigSIB1') with monitoring pattern for Type0-PDCCH, scheduling the SIB1. This configuration gives the UE the length of the Control Resource Set (CORESET) in terms of symbols {e.g., 1, 2, or 3}, number of contiguous resource blocks (e.g., 24, 48, or 96}, frequency location of the CORESET (in relation to the SSB location) and the used pattern and parametrization for the monitoring pattern. For example for SS/PBCH and CORESET monitoring pattern 1 where monitoring occasion occurs every 20 ms, the UE is given an offset (O) from the start of the radio frame (where occasions occur), with a shift (M) placing the monitoring occasion corresponding each SSB in time, together with number of possible monitoring occasions per slot. Based on the detected SSB index, information provided by MIB the UE can determine the monitoring occasion (search space) corresponding to each SSB index. FIG. 8 illustrates one realization of search space locations (e.g., paging occasions).

Without in any way limiting the scope, interpretation, or application of the claims appearing below, a technical effect of one or more of the example embodiments disclosed herein may be enhanced monitoring of pages.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
      receive, from a base station, information indicating a start of one or more paging occasions within at least a portion of a subframe, the information comprising a bit map indicating the start of the one or more paging occasions within at least the portion of the subframe, wherein a bit length of the bit map is based on a subcarrier spacing being used, such that the start of the one or more paging occasions is based on the bit length and the subcarrier spacing being used; and
      monitor the one or more paging occasions in accordance with the received information including the bit map.

2. The apparatus of claim 1, wherein the base station provides a different bit map based on the subcarrier spacing being used at the apparatus.

3. The apparatus of claim 2, wherein the bit length of the bitmap depends on a quantity of slots, the quantity of slots based on the subcarrier spacing being used by the apparatus and a time division duplex pattern length being used by the apparatus.

4. The apparatus of claim 2, wherein the bitmap indicates the one or more paging occasion start locations at a start of an uplink-downlink concatenated pattern of a paging frame.

5. The apparatus of claim 4, wherein a duration of the paging frame is divided into blocks, each block corresponding to a period of the uplink-downlink concatenated pattern.

6. The apparatus in claim 1, wherein the one or more paging occasions include one or more physical downlink control channel monitoring occasions.

7. The apparatus of claim 1, wherein the apparatus comprises or is comprised in a user equipment.

8. A method comprising:
   receiving, by a user equipment, information from a base station, the information indicating a start of one or more paging occasions within at least a portion of a subframe, the information comprising a bit map indicating the start of the one or more paging occasions within at least the portion of the subframe, wherein a bit length of the bit map is based on a subcarrier spacing being used, such that the start of the one or more paging occasions is based on the bit length and the subcarrier spacing being used; and
   monitoring, by the user equipment, the one or more paging occasions in accordance with the received information including the bit map.

9. The method of claim 8, wherein the base station provides a different bit map based on the subcarrier spacing being used at the user equipment.

10. The method of claim 9, wherein the bit length of the bitmap depends on a quantity of slots, the quantity of slots based on the subcarrier spacing being used by the user equipment and a time division duplex pattern length being used by the user equipment.

11. The method of claim 9, wherein the bitmap indicates the one or more paging occasion start locations at a start of an uplink-downlink concatenated pattern of a paging frame.

12. The method of claim 9, wherein a duration of the paging frame is divided into blocks, each block corresponding to a period of the uplink-downlink concatenated pattern.

13. The method of claim 8, wherein the one or more paging occasions include one or more physical downlink control channel monitoring occasions.

14. An apparatus comprising:
   at least one processor; and
   at least one memory including computer program code, the at least one memory and the computer program code configured to, with the at least one processor, cause the apparatus to at least:
      send, to a user equipment, information indicating a start of one or more paging occasions within at least a portion of a subframe, the information comprising a bit map indicating the start of the one or more paging occasions within at least the portion of the subframe, wherein a bit length of the bit map is based on a subcarrier spacing being used, such that the start of the one or more paging occasions is based on the bit length and the subcarrier spacing being used; and
      trigger one or more paging occasions in accordance with the sent information including the bit map.

15. The apparatus of claim 14, wherein a different bit map is sent based on the subcarrier spacing being used at the user equipment.

16. The apparatus of claim 14, wherein the bit length of the bitmap depends on a quantity of slots, the quantity of slots based on the subcarrier spacing being used by the apparatus and a time division duplex pattern length being used by the apparatus.

17. The apparatus of claim 15, wherein the bitmap indicates the one or more paging occasion start locations at a start of an uplink-downlink concatenated pattern of a paging frame.

* * * * *